Figure 1:
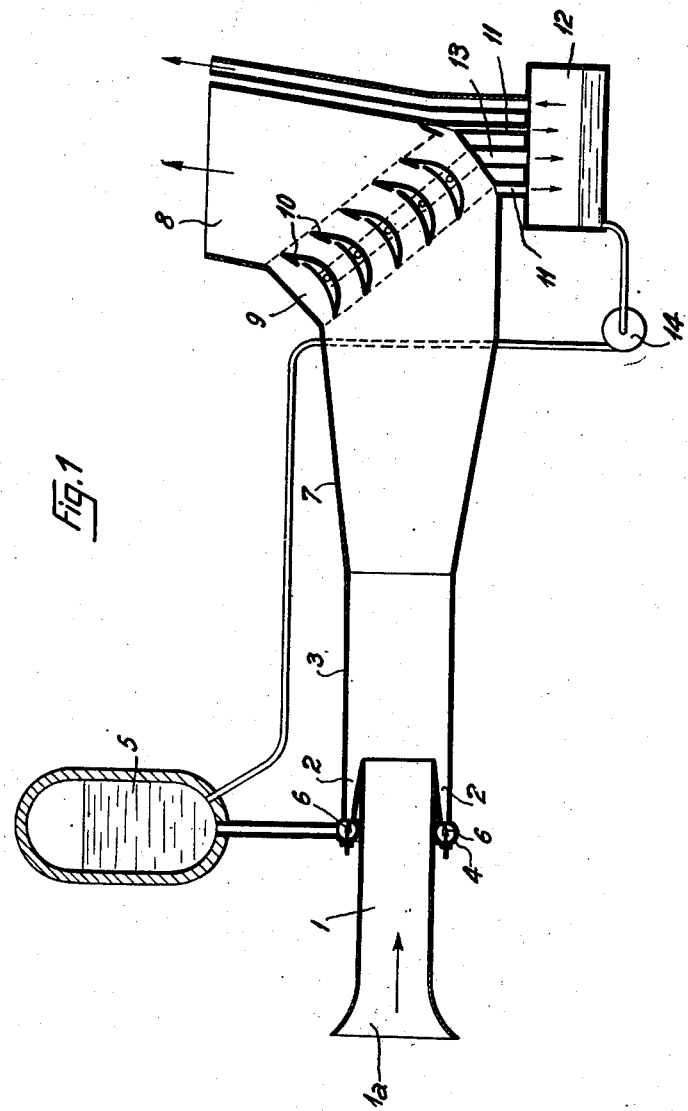

Dec. 1, 1959  O. FRENZL  2,914,941
HIGH-SPEED WIND TUNNELS
Filed Nov. 30, 1954  2 Sheets-Sheet 1

INVENTOR
Otto Frenzl
By Watson, Cole, Grindle and Watson
ATTORNEYS

Dec. 1, 1959 O. FRENZL 2,914,941
HIGH-SPEED WIND TUNNELS
Filed Nov. 30, 1954 2 Sheets-Sheet 2
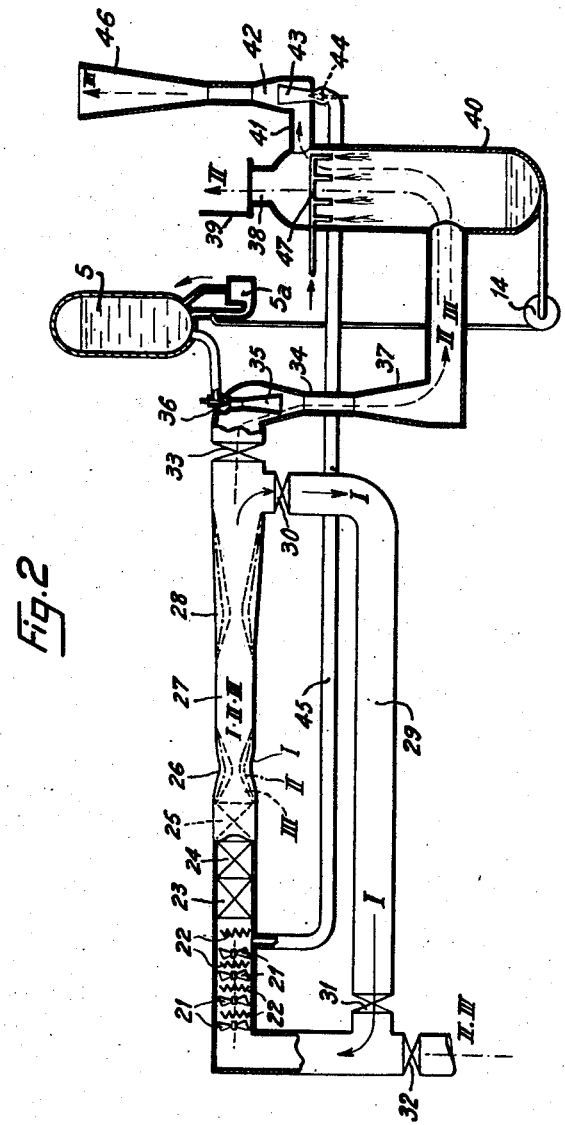
INVENTOR
Otto Frenzl
By Watson, Cole, Grindle and Watson
ATTORNEYS

United States Patent Office 2,914,941
Patented Dec. 1, 1959

2,914,941

HIGH-SPEED WIND TUNNELS

Otto Frenzl, Dammarie-les-Lys, France, assignor to Societe Nationale d'Etude et de Construction de Moteurs d'Aviation, Paris, France, a company of France Application November 30, 1954, Serial No. 472,085

Claims priority, application France April 27, 1954

14 Claims. (Cl. 73—147)

High-speed wind tunnels require enormous power for the propulsion of the flow of air, and in consequence, they entail the employment of very costly equipment. In order to keep the power required to a relatively low value, blowdown, or intermittent-flow, wind tunnels have been proposed, operating in squalls or blasts by means of ejectors the driving agent of which is compressed air or steam. The essential costs of installation and use of a wind tunnel of this kind depend on the storing system.

The improvement which forms the object of the present invention enables these costs to be reduced.

In accordance with this improvement, the ejector which serves to set the air in movement is a water ejector supplied with hot water under pressure from an accumulator of hot water.

The description which follows below with reference to the attached drawings (which are given by way of example only and not in any sense by way of limitation) will make it quite clear how the invention may be carried into effect, the special features which are brought out, either in the drawings or in the text, being understood to form a part of the said invention.

Figs. 1 and 2 are diagrammatic cross-section of two forms of embodiment of a wind tunnel in accordance with the present invention.

In the form of embodiment shown in Fig. 1, which is suitable for use with both subsonic and supersonic wind tunnels, there has been shown at 1 by way of example, a subsonic test or measuring chamber into which the exterior air can pass through the orifice 1a. The air is driven at high speed through this chamber by means of a water ejector comprising a number of discharge-nozzles 2 distributed around the axis of the chamber 1, or a centrally-located discharge-nozzle delivering into the conduit 3 which forms a continuation of this chamber. The discharge-nozzles 2 are supplied with hot water under pressure from a common manifold 4, the water being provided by a hot water accumulator 5 suitably heat-insulated and heated by appropriate means (not shown). Each discharge nozzle 2 is provided with a needle valve 6 or other regulating member which enables the cross-section of passage available to the water in the discharge nozzle to be varied. When these valves are open, the hot water from the accumulator 5 is driven at high speed into the discharge nozzle 2 by the pressure of steam in the accumulator. A part of the hot water becomes vaporised in the discharge nozzle, but the greater part remains liquid and is converted into fine spray in these nozzles, from which is ejected a jet of steam and spray which draws the exterior air through the measuring chamber 1, thus driving through this chamber a flow of air at high speed. At the outlet of the chamber, the air is stirred up inside the conduit 3 with the steam and the fine water spray. The flow is slowed-down in the diffuser 7 which follows the conduit 3 and the air escapes from the wind tunnel at 8. The hot and liquid particles contained in the air are preferably recovered before the exhaust by means of an arrangement 9 which, in the example shown in the drawing, comprises an elbow in the conduit system and provided with a certain number of curved and hollow vanes 10. Conduits 11 serve to return the water which collects in the lower portion of the elbow into a reservoir 12. In addition, the vanes are pierced with holes on their internal curved sides and their interior is connected to a conduit 13 which also leads the water which is deposited on the internal sides of the vanes into the reservoir 12. A pump 14 enables the hot water thus recovered to be fed back to the accumulator 5.

The advantages of driving the air by means of an ejector of hot water are as follows:

(1) The accumulator can be of relatively small dimensions and its cost price is low. It can be almost completely filled and it can also be totally emptied. In view of it slow surface area, the heat losses are small.

(2) The economic efficiency of the wind tunnel in operation is relatively high, in view of the fact that at no great cost a sufficiently high working pressure may be chosen for the system to work in the region of good thermal efficiency.

(3) By reason of the high density of the driving agent, the conduit system, the valves, the regulating members and the ejector itself are of relatively small size.

(4) The noise level of the wind tunnel is very low, due to the fact that the tiny drops of water carried along in the air-stream deaden the sound.

The form of embodiment shown in Fig. 2 is more complex.

It comprises the combination of a wind tunnel with a hot water ejector in order to produce the movement of the air, as well as various circuits which can be put into operation as may be required, and an air ejector which enables the speed of flow of the air inside the measuring chamber to be increased. In this way, it is possible to produce a flow having a high Mach number.

In Fig. 2, there will first of all be seen the circuit 1 which can operate as a closed circuit and which comprises:

An air compressor 21 having a number of stages separated by air cooling devices 22, a mechanical water decanter 23, a de-hydrator 24, in certain cases an air heater 25 (which serves to avoid condensation at high Mach numbers), a discharge-nozzle 26 intended to impart a high speed to the air, this nozzle being movable so as to be changed and replaced by another having a different neck section depending on the speed of flow which it is desired to obtain, the measuring chamber 27, the adjustable convergent-divergent nozzle 28 which serves to slow-down the speed of the air at the outlet of the measuring chamber, and finally the return pipe 29 which returns the air to the suction side of the compressor and which includes the valves 30 and 31. When this circuit is in operation, the said valves 30 and 31 are, of course, open, whilst the atmospheric air suction valve 32 is closed, as is also the valve 33.

This valve 33 enables the outlet of the convergent-divergent section 28 to communicate with the intake of a hot water ejector 34, the driving nozzle 35 of which, provided with the needle valve 36, is supplied from the heat-insulated hot water accumulator 5. The ejector is followed by the diffuser 37 and by an exhaust outlet 38 to the atmosphere, provided with a valve 39. Below the elbow through which the fluid passes coming from the ejector before being passed through the exhaust orifice 38, is provided a reservoir 40 in which the particles of liquid water carried by the fluid fall down and are collected, the water thus recovered being returned by a pump 14 to the accumulator 5, preferably in the upstream branch of the circuit 5a in which the water associated with the accumulator is heated. A device with vanes analogous to the vanes 10 of Fig. 1 may be provided in the elbow through which the fluid passes above the reservoir 40.

A little on the upstream side of the exhaust orifice 38, there is connected a conduit 41 which terminates in a compressed air ejector 42, the driving nozzle 43 of which is provided with the needle valve 44, and is supplied when this valve is open with compressed air tapped by means of the conduit 45 from the delivery side of the air compressor. This ejector 42 is followed by the diffuser 46 which delivers to atmosphere. A shower type cooling and condensing device 47 is provided on the upstream side of the conduit 41 to condense the steam contained in the air when the compressed air ejector 42, 43 is used.

The operation of this form of embodiment is as follows:

When a flow of only a comparatively small Mach number is desired in the measuring chamber, the valves 30, 31 are opened, the valves 32, 33 are closed and the needle valves 36 and 44 are also closed. The air is then set in movement in the closed circuit I solely driven by the compressor 21. The discharge-nozzle 26 employed is that having a neck of the largest section, as has been indicated in Fig. 2 by the numeral 1.

If it is desired to obtain a flow of a higher Mach number, the valves 30 and 31 are closed and the valves 32, 33 and 39 are opened. The compressor then has its intake from the atmosphere through the valve 32 and delivers through the ejector 34 towards the exhaust orifice 38. By opening the needle-valve 36, the hot water ejector is brought into action and this accelerates the jet of air passing through the measuring chamber 27, by reducing the back-pressure at the outlet of the convergent-divergent nozzle 28. The circuit which is then established is that marked as II in the drawing. The discharge nozzle 26 used has then a smaller neck than in the previous case, corresponding to the speed to be obtained in the chamber 27.

If it is desired to obtain a still higher Mach number, the valve 39 is closed so that the air must pass through the conduit 41 and the compressed air ejector 42, to pass to exhaust at 46. Leaving the hot water ejector in service, the needle valve 44 is opened so as to cause the compressed air ejector to function, and this accelerates the flow. In addition, the condenser 47 is set in operation. The circuit which is set in operation in this way is marked III on the drawing. This discharge nozzle 26 used is that which has the smallest section of neck.

It will, of course, be understood that modifications may be made to the forms of embodiment which have just been described, in particular by the substitution of equivalent technical means, without thereby departing from the scope of the present invention as defined in the subjoined claim.

What I claim is:

1. The combination, with a high-speed wind tunnel of the ejection type having a test chamber and an air conveying duct connected therewith and operating by means of an ejector nozzle opening into said duct and designed for inducing a flow of air through said duct and chamber, when said nozzle is supplied with motive fluid, of an accumulator containing a supply of hot water at a temperature greater than its boiling temperature at atmospheric pressure, and under a pressure sufficient to prevent boiling, means for delivering the said hot water from said accumulator to the nozzle in liquid form, whereby said water in passing through said nozzle partially vaporizes and expands, carrying with it a part of said water in the form of a fine spray.

2. The combination, with a high-speed wind tunnel of the ejection type having a test chamber and an air conveying duct connected therewith and operating by means of an ejector nozzle opening into said duct and designed for inducing a flow of air through said duct and chamber, when said nozzle is supplied with motive fluid, of means for supplying to said ejector nozzle in liquid form a supply of hot water at a temperature above its boiling temperature at atmospheric pressure, and under a pressure sufficient to prevent boiling, whereby said water in passing through the nozzle partially vaporizes and expands, carrying with it a part of the water in the form of a fine spray.

3. The combination of claim 1, comprising further an air exhaust circuit downstream of the ejector nozzle, means in said circuit for separating hot water in liquid form carried along by the air flow from the air, and means in said circuit for collecting the separated water.

4. The combination of claim 3, comprising further a pump for returning the water collected in the collecting means to the accumulator of hot water.

5. The combination of claim 3, wherein the water separating means comprises an elbow in the air exhaust circuit, and a plurality of curved vanes in said elbow.

6. The combination with a high speed wind tunnel of the ejection type, having a test chamber and an air conveyor duct connected therewith and operating by means of an ejector nozzle opening into said duct and designed for inducing a flow of air through said duct and chamber, when said nozzle is supplied with motive fluid in hot water under pressure connected with said nozzle for directly supplying thereto motive fluid in the state of hot water under pressure, and comprising further air circulating means in series flow arrangement with the duct and chamber.

7. The combination of claim 6, wherein the air circulating means comprises an air compressor arranged upstream of the duct and chamber.

8. The combination of claim 7, wherein the test chamber is located between the compressor and the duct.

9. The combination of claim 6, wherein the air circulating means comprises an ejector nozzle energized with air under pressure.

10. The combination of claim 9, wherein the air ejector nozzle is located downstream of the hot water ejector nozzle.

11. The combination of claim 10, comprising further a water condenser arranged in the path of the flow between the hot water ejector nozzle and the air ejector nozzle.

12. A high-speed wind tunnel comprising an air compressor, a test chamber connected with the delivery side of said compressor, an air conveying duct communicating with and downstream of said chamber, an ejector nozzle opening into said duct and designed for increasing, by induction effect, the flow velocity through said duct and chamber, a source of hot water under pressure, piping means between said source and said ejector nozzle for supplying said nozzle with hot water under pressure, an exhaust air circuit downstream of said duct, means in said circuit for separating water carried along by the air flow from the air, means in said circuit for collecting the separated water, a pump for returning the water collected in said collecting means to said source of hot water, a further ejector nozzle opening into said circuit at a point thereof downstream of said water separating and collecting means and designed for further increasing, by induction effect, the flow velocity through said circuit, and piping means between said compressor and the latter-mentioned nozzle for supplying the same with air under pressure.

13. A wind tunnel as claimed in claim 12, further comprising valve means at the junction between the test chamber and the air conveying duct for opening and closing said junction, further valve means on the suction side of the air compressor, a return branch pipe extending between said junction just upstream of the former-mentioned valve means and said suction side just downstream of said latter-mentioned valve means, valve means in said return pipe for opening and closing the same, valve means in the piping means supplying hot water under pressure to the former-mentioned ejector nozzle, and valve means in the piping means supplying air under pressure to the latter-mentioned ejector nozzle.

14. A wind tunnel as claimed in claim 12, further comprising a bleed in the air exhaust circuit at a point thereof between the water separating and collecting means and the latter-mentioned ejector nozzle, control means for opening and closing said bleed, and valve means in the piping means supplying air under pressure to the latter-mentioned ejector nozzle.

References Cited in the file of this patent

UNITED STATES PATENTS

| | | |
|---|---|---|
| 1,751,719 | Uhrl | Mar. 25, 1930 |
| 2,268,656 | Haltmeier | Jan. 6, 1942 |
| 2,515,069 | Zola | July 11, 1950 |
| 2,519,531 | Worn | Aug. 22, 1950 |
| 2,744,410 | Browning | May 8, 1956 |

FOREIGN PATENTS

| | | |
|---|---|---|
| 638,052 | Great Britain | May 31, 1950 |
| 670,930 | Great Britain | Apr. 30, 1952 |